(12) United States Patent
Hikmet et al.

(10) Patent No.: US 11,504,926 B2
(45) Date of Patent: Nov. 22, 2022

(54) USE OF SEMI-CRYSTALLINE POLYMER WITH LOW $T_g$ AND POST-CRYSTALLIZATION FOR EASY 3D PRINTING AND TEMPERATURE STABLE PRODUCTS

(71) Applicant: SIGNIFY HOLDING B.V., Eindhoven (NL)

(72) Inventors: Rifat Ata Mustafa Hikmet, Eindhoven (NL); Johan Lub, Valkenswaard (NL); Edward Theodorus Maria Berben, Herten (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 789 days.

(21) Appl. No.: 16/063,333

(22) PCT Filed: Dec. 12, 2016

(86) PCT No.: PCT/EP2016/080633
§ 371 (c)(1),
(2) Date: Jun. 18, 2018

(87) PCT Pub. No.: WO2017/108477
PCT Pub. Date: Jun. 29, 2017

(65) Prior Publication Data
US 2018/0370165 A1 Dec. 27, 2018

(30) Foreign Application Priority Data
Dec. 22, 2015 (EP) ..................................... 15201894

(51) Int. Cl.
*B29C 71/02* (2006.01)
*B29C 64/118* (2017.01)
(Continued)

(52) U.S. Cl.
CPC ............ *B29C 71/02* (2013.01); *B29C 64/118* (2017.08); *B29C 64/30* (2017.08);
(Continued)

(58) Field of Classification Search
None
See application file for complete search history.

(56) References Cited

U.S. PATENT DOCUMENTS

2002/0113331 A1 8/2002 Zhang et al.
2013/0307010 A1 11/2013 Hikmet et al.
(Continued)

FOREIGN PATENT DOCUMENTS

CN 103608167 A 2/2014
EP 0833237 A2 4/1998
(Continued)

*Primary Examiner* — Matthew J Daniels
*Assistant Examiner* — Paul Spiel
(74) *Attorney, Agent, or Firm* — Daniel J. Piotrowski

(57) ABSTRACT

The invention provides a method for manufacturing a 3D item (10) with a fused deposition modeling 3D printer, the method comprising (a) providing a thermoplastic material (20), wherein the thermoplastic material (20) comprises a first polymer (21) of the semi-crystalline type, wherein the first polymer (21) has a glass temperature ($T_g$) and wherein the thermoplastic material (20) has a melting temperature ($T_m$); generating in a generation stage an intermediate 3D printed item (110) by printing the thermoplastic material (20), wherein the thermoplastic material (20) is heated to a temperature equal to or above the melting temperature ($T_m$), while maintaining during printing an ambient temperature ($T_a$) to the intermediate 3D printed item under construction below the glass temperature ($T_g$); and generating in an annealing stage said 3D item (10) by heating the intermediate 3D printed item (110) equal to or above the glass temperature ($T_g$).

10 Claims, 2 Drawing Sheets

(51) Int. Cl.
*B29C 71/00* (2006.01)
*B33Y 70/00* (2020.01)
*B33Y 10/00* (2015.01)
*B33Y 40/00* (2020.01)
*B29C 64/30* (2017.01)

(52) U.S. Cl.
CPC .... *B29C 71/0063* (2013.01); *B29C 2071/022* (2013.01); *B33Y 10/00* (2014.12); *B33Y 40/00* (2014.12); *B33Y 70/00* (2014.12)

(56) References Cited

U.S. PATENT DOCUMENTS

2015/0145168 A1 5/2015 Rodgers et al.
2015/0259530 A1 9/2015 Rodgers et al.

FOREIGN PATENT DOCUMENTS

EP 2115043 A2 11/2009
WO 2015069986 A1 5/2015

USE OF SEMI-CRYSTALLINE POLYMER WITH LOW $T_g$ AND POST-CRYSTALLIZATION FOR EASY 3D PRINTING AND TEMPERATURE STABLE PRODUCTS

CROSS-REFERENCE TO PRIOR APPLICATIONS

This application is the U.S. National Phase application under 35 U.S.C. § 371 of International Application No. PCT/EP2016/080633, filed on Dec. 12, 2016 which claims the benefit of European Patent Application No. 15201894.1, filed on Dec. 22, 2015. These applications are hereby incorporated by reference herein.

FIELD OF THE INVENTION

The invention relates to a method for manufacturing a 3D item. The invention further relates to such 3D item, such as obtainable with such method for manufacturing the 3D item.

BACKGROUND OF THE INVENTION

Fused deposition modelling (FDM) is known in the art. EP0833237 describes for instance an apparatus incorporating a movable dispensing head provided with a supply of material which solidifies at a predetermined temperature, and a base member, which are moved relative to each other along "X", "Y," and "Z" axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed. Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer.

WO-2015/069986 discloses a resin source comprising polylactic acid for use in a fused filament fabrication process. Post-manufacturing annealing of objects printed with polylactic acid is not possible because such objects would not maintain their shape at temperatures higher than the glass transition temperature that is required for annealing. The resin source of WO-2015/069986 comprises polylactic acid in a range from 50% to 99% by weight, and talc in a range from 7% to 40% by weight. The talc is a filler material that serves to enable post-fabrication annealing of objects printed with polylactic acid in order to achieve sufficient durability and thermal stability for such printed objects.

SUMMARY OF THE INVENTION

Within the next 10-20 years digital fabrication will increasingly transform the nature of global manufacturing. One of the aspects of digital fabrication is 3D printing. Currently many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Another term for FDM is "fused filament fabrication" (FFF). Herein, the term "filament 3D printing" (FDP) is applied, which is considered to be equivalent to FDM or FFF. In general, FDM printers use a thermoplastic filament, which is heated to (or above) its melting point and then extruded, layer by layer, (or in fact filament after filament) to create a three dimensional object. FDM printers are relatively fast and can be used for printing complicated objects.

One of the problems associated with FDM is the shrinkage of the polymer during printing. The shrinkage below the solidification temperature (glass transition or melting temperature) leads to formation of internal stress. This can lead to deformation of the object, formation of cracks, and also its delamination from the printing plate (herein also called "receiver item").

To avoid this problem polymers with a relatively low glass temperature $T_g$ (usually less than 80° C.) can be used in order to minimize the stress build up during curing and avoid associated problems. However, it appears that polymers with such a low glass (transition) temperature are not suitable for most (higher temperature) applications. Another option to avoid this problem may be to use a heated chamber. However, the use of such chamber may have disadvantages in production as it needs time for heating and cooling and the printing parts in such a heated up chamber need to be externally cooled during 3D printing, making the printer rather costly.

Hence, it is an aspect of the invention to provide an alternative method for manufacturing a 3D item ("item"), which preferably further at least partly obviates one or more of above-described drawbacks, and which may especially be used to execute the herein described method for manufacturing a 3D item.

Here we suggest the use of semi-crystalline polymers with relatively low glass (transition) temperature $T_g$. During printing the polymer cools/is cooled rapidly so that it remains mainly amorphous. As a result, only the glass transition temperature plays a role in stress build up and the printed part can produced without problems. Subsequently, the (intermediate) 3D printed item can be annealed to induce crystallization. After the annealing phase the crystallinity can be induced and the usage temperature of the object is increased to the melting temperature of the material which can be much higher (than the glass temperature).

Hence, in a first aspect the invention provides a method for manufacturing a 3D item ("item" or "object" or "3D printed item") with a fused deposition modeling 3D printer (herein also indicated as "FDM printer"), the method comprising (a) providing a thermoplastic material ("mixture"), wherein the thermoplastic material comprises (a1) a first polymer having a mass fraction of at least 90% and (a2) an additive having a mass fraction of 0-6%, wherein the first polymer comprises a semi-crystalline aromatic polyester; (b) generating in a generation stage an intermediate 3D printed item ("intermediate item" or "intermediate object" or "3D printed intermediate item") by printing the thermoplastic material, wherein the thermoplastic material is heated to a temperature equal to or above a melting temperature ($T_m$) of the thermoplastic material, while maintaining during printing an ambient temperature ($T_a$) of the intermediate 3D printed item under construction at a temperature below the glass temperature ($T_g$) of the first polymer; and (c) generating in an annealing stage said 3D item by heating the intermediate 3D printed item to a temperature equal to or above the glass temperature ($T_g$) of the first polymer.

With such method, a 3D item can be generated which can nevertheless be used at relative high temperatures, such as over 100° C., even above 150° C., and well over the glass temperature, without the risk of (substantial) deterioration (deformation) of the 3D printed item. Further, a 3D item can be obtained with no or reduced formation of (internal) stress or even cracks.

The method includes the use of a thermoplastic material comprising a first polymer, wherein the first polymer comprises a semi-crystalline aromatic polyester. In other words, the thermoplastic material comprises a first polymer of the semi-crystalline type. Hence, the first polymer may have substantially no crystallinity, i.e. is amorphous, but is able to crystallize, i.e. become a semi-crystalline polymer with crystallinity and amorphous features, as is known in the art. Hence, this polymer is indicated as "first polymer of the semi-crystalline type". The first polymeric mixture thus comprises the first polymer, which has no or a low semi-crystallinity (see also below). Comparing polyethylene terephthalate (PET), which is a semi-crystalline aromatic polyester (i.e. can form semi-crystalline polymeric items), with polycarbonate (PC), which is substantially not a semi-crystalline polymer, it appeared that PET may provide the advantages of the invention whereas PC may provides items that are show shrinkage, warpage, delamination and cracks in the printed object. The thermoplastic material is especially provided as a filament. Hence, instead of the term "thermoplastic material" also the term "thermoplastic filament" may be used.

The first polymer has a glass temperature ($T_g$) and a melting temperature ($T_m$). Especially, the first polymer has a glass temperature ($T_g$) below 150° C., more especially 120° C., such as even below 100° C. Especially, the glass temperature may be selected from the range of 60-150° C., such as 70-100° C. Further, the first polymer especially has a melting temperature ($T_m$), especially of at least 120° C., such as at least 150° C., like more especially at least 200° C., in embodiments selected from the range of 150-350° C., such as 150-300° C., such as especially selected from the range of 150-250° C., though higher melting temperatures may also be possible.

The melting temperature ($T_m$) is higher than the glass temperature, i.e. $T_m > T_g$. Hence, in specific embodiments the first polymer has a glass temperature ($T_g$) below 120° C. and a melting temperature ($T_m$) of at least 150° C., such as a melting temperature ($T_m$) of at least 200° C.

Herein, the term "first polymer" may also refer to a plurality different first polymers.

An aim of the invention is to use a 3D printable thermoplastic material to 3D print a 3D item, wherein during 3D printing the 3D item remains amorphous. For this purpose, the method of the invention makes use of semi-crystalline aromatic polyesters. Such compounds are relatively "stiff" so that they do not crystallize as easily as more flexible polymers such as polylactic acid and other polymers such as poly-olefins. Furthermore, semi-crystalline aromatic polymers crystallize and form crystals by reorganization of small parts of polymer segment which leads to a stiff polymeric structure physically "cross-linked" by such crystallites. Therefore, in the semi-crystalline state aromatic polyesters remain stiff even above the Tg of the material. Flexible polymers such as polylactic acid tend to crystallize by chain folding and even after crystallization, due to the flexibility of the chains, they remain relatively soft especially above the Tg of the material. Such flexible polymers also need a large amount of fillers to stop them from flowing when they need to be annealed above Tg for inducing crystallization. A large amount of fillers is typically not desirable because it tends to lead to rougher surfaces, and because the use of small nozzle sizes. Finally, polylactic acid and potentially other flexible polymers as well, is a biodegradable material, which means that it has a poor stability and cannot be used in applications where a relatively high chemical stability is required.

The thermoplastic material may also comprise a second polymer, not showing semi-crystalline behavior or only showing such behavior at e.g. very high (>350° C. or very low temperatures (<80° C.). Especially, such second polymer when available is miscible with the first polymer. Especially, when a second polymer is available, the second polymer may react with the first polymer during the heating to equal to or above the temperature of $T_m$ during the generation stage. Likewise, monomers and/or oligomers may be available.

In specific embodiments, the thermoplastic material comprises at least 50 wt. %, especially at least 75 wt. %, such as even more especially at least 80 wt. %, yet even more especially at least 85 wt. %, such as even more especially at least 90 wt. % of the first polymer, like even at least 95 wt. %. Hence, the thermoplastic material may essentially consist of the first polymer, and may even be 100 wt. % first polymer. Best results may be obtained when the thermoplastic material has a high content, such as at least 85 wt. %, even more especially at least 90 wt. % of the first polymer, or yet even more. Therefore, the mass fraction of the first polymer is especially at least 90%, such as even at least 95%, like even more especially 100% (i.e. substantially no additive; see also below).

Herein the term "polymer" may refer to a homopolymer or a heteropolymer. Further, the term "polymer" may herein refer to one or more of alternating copolymers, periodic copolymers, block copolymers, grafted co-polymers, etc. The term "polymer" may refer to a branched polymer or to an unbranched polymer. Yet further, the term "polymer" may refer to an aromatic polymer or an aliphatic polymer, etc.

In addition to the first polymer and the optional second polymer, the thermoplastic material may optionally comprise also an additive. The term "additive" may also refer to a plurality of different additives. In embodiments, the additive comprises one or more of a colorant, a luminescent material, and a reflective material. Especially, the additive is not available, or available in a low amount, such as at maximum 10 wt. %, such as at maximum 8 wt. %, like at maximum 6 wt. %, relative to the total weight of the thermoplastic material. When the additive comprises a colorant, the content may be equal to or less than 1 wt. %, such as 0.001-0.1 wt. %. The additive may comprise one or more of an organic additive and an inorganic additive. Especially, the additive comprises an inorganic additive. Alternatively or additionally, the additive may comprise an organic dye. Hence, in specific embodiments the thermoplastic material comprises 0-6 wt. % additive and at least 90 wt. % of the first polymer, relative to the total weight of the thermoplastic material. In yet more specific embodiment, the thermoplastic material comprises 0-5 wt. % additive, such as 0-1 wt. % additive, and at least 95 wt. % of the first polymer, relative to the total weight of the thermoplastic material. Hence, the mass fraction of the additive is at maximum 10%, but especially in the range of 0-6%, with 0% indicating that there is no additive, even more especially in the range of 0-1%, such as 0.001-1%.

As indicated above, the thermoplastic material has a melting temperature $T_m$. This melting temperature may deviate from the melting temperature of the first polymer, as the thermoplastic material may also include other materials, such as a second polymer. However, the melting temperature of the thermoplastic material will in general be substantially identical to the melting temperature of the first polymer, as the thermoplastic material may predominantly include the first polymer. Hence, especially the thermoplastic material has a melting point ($T_m$) in the range of at least 150° C., such as at least 200° C., like selected from the range of 200-350° C., like in the range of 200-300° C.

As also indicated above, the method includes generating in a generation stage an intermediate 3D printed item by printing the thermoplastic material with a fused deposition modeling 3D printer, wherein the thermoplastic material is heated in a part of a fused deposition modeling 3D printer to a temperature equal to or above the melting temperature ($T_m$) (for printing the thermoplastic material), while maintaining an ambient temperature ($T_a$) (of the intermediate 3D printed item under construction) during printing below the glass temperature ($T_g$).

This heating equal to or above the melting temperature ($T_m$) is necessary to print the filaments from the thermoplastic material. Especially, heating may be at least 10° C., such as at least 20° C., like at least 50° C., above the melting temperature. The intermediate item is produced by an fused deposition method. This is herein indicated by "printing with a fused deposition modelling 3D printer" and similar sentences. Especially, in the printer, even more especially in a printer head of the 3D printer, the thermoplastic material is heated to a temperature equal to or above the melting temperature of the thermoplastic material (and thus in general also equal to or above the melting temperature of the first polymer). Hereby, the polymer becomes printable and is printed on a support or on earlier printed material on the support. Hence, the thermoplastic material is heated to a temperature equal to or above a melting temperature ($T_m$) of the thermoplastic material especially to enable its deposition (i.e. printing). Heating is especially done during its extrusion stage, i.e. when the filaments are pressed through the printer head.

Hence, the polymeric material before printing may be indicated as "printable material" or "3D printable material" and the polymeric material after printing may be indicated as printed material or "3D printed material". The 3D printable material will be heated by the 3D printer before it leaves the nozzle to a temperature of at least the glass transition temperature, and in general at least the melting temperature.

During printing, the ambient temperature ($T_a$) is much lower and may even be room temperature. For instance, the printer may be used in a chamber or room at room temperature, such as below 40° C., like especially below 30° C., like below 25° C., like in the range of 17-22° C. Hence, especially the method includes maintaining during printing an ambient temperature ($T_a$) of the 3D printed item under construction below the glass temperature ($T_g$) of the first polymer. The 3D printed material (on the support or receiver item) thus especially experiences a the relative low ambient temperature. Thereby, the 3D printed material cools relatively quickly. The ambient temperature is the temperature of the ambient surrounding the 3D printed material. Here, the term "3D printed item under construction" is used, as this indicates the stage from the first deposition leading to the intermediate 3D printed item until the last deposition leading to a (substantially) ready intermediate 3D printed item. After the "construction", i.e. when the intermediate 3D printed item is ready, the annealing stage may be started.

Alternatively or additionally, the printer may include such chamber. Hence, in embodiments the fused deposition modeling 3D printer comprises a printing chamber within which the generation stage is executed, and wherein the method further comprises maintaining the printing chamber during at least part of the generation stage below the glass temperature ($T_g$) (of the first polymer). The printer head may be configured in such printing chamber. The temperature maintained in the printing chamber during the generation stage may be as indicated above.

During the generation stage, especially during the first part of the stage when there is no printed 3D material, or only a few layers, it may be useful to keep the receiver item, on which the thermoplastic material or printable material is printed, at a relative low temperature, such as at or below the above indicated ambient temperatures. Hence, in yet further embodiments, the fused deposition modeling 3D printer comprises a receiver item, and wherein the method further comprises maintaining the receiver item during at least part of the generation stage at a temperature below the glass temperature ($T_g$) (of the first polymer).

The use of ambient temperature allows a relative easy processing and saves costs. Further, the advantage is a fast cooling of the thermoplastic material escaping from the printer head to ambient temperature, such that the first polymer substantially remains amorphous. Hence, the degree of crystallinity of the thermoplastic material of the intermediate item (before annealing) may be below 10%, such as below 5%, yet even more especially below 2%, such as below 1%. The degree of crystallinity can be determined via different methods, such as a density measurement, differential scanning calorimetry (DSC), X-ray diffraction (XRD), infrared spectroscopy and nuclear magnetic resonance (NMR). Herein, the degree of crystallinity is especially determined with DSC.

Hence, especially the fast cooling is desirable. Hence, the method especially comprises printing the intermediate item and cooling it below the glass temperature ($T_g$) (of the first polymer) at a fast rate so that the degree of crystallinity of the item is less than 10%, yet more especially less than 5%, more especially less than 2% and most especially less than 1%. Hence, the cooling may be such that the degree of crystallinity does not substantially increase during the generation stage (including the cooling).

The intermediate 3D printed item is thus especially not the final item, but has to be annealed in a subsequent annealing stage to be converted to the final 3D printed item. Hence, when having generated the intermediate 3D item, the annealing stage may be commenced. The intermediate 3D printed item is heated equal to or above the glass temperature ($T_g$) in an annealing stage. In this way, the 3D item is generated. This may be done in an apparatus separate (and remote) from the 3D printer. However, as indicated above, in embodiments the 3D printer may also include a printing chamber. Optionally, such chamber may be used to anneal the intermediate item. Hence, in embodiments the method comprises heating the printing chamber during at least part of the annealing stage at a temperature equal to or above the glass temperature ($T_g$). Especially, heating may be at least 10° C., such as at least 20° C., like at least 50° C. or more, such as at least 100° C., above the glass temperature. Characteristic annealing temperatures may thus be equal to or above 200° C. and characteristic annealing times may be in the range of 5-60 minutes. Especially, the annealing is executed to introduce or increase crystallinity. Hence, in embodiments the method comprises heating the intermediate 3D printed item equal to or above the glass temperature ($T_g$) (of the first polymer) until a degree of crystallinity of the first polymer in the range of at least 20%, such as especially in the range of 20-70%, like at least 35%, or higher, or even higher than 70%, is obtained. This results in a semi-crystalline polymer (or semi-crystalline thermoplastic material). In embodiments, the semi-crystalline polymer is (thus) the first polymer but now in the semi-crystalline state. Hence, in embodiments the term "semi-crystalline polymer" may also be interpreted as "semi-crystalline first polymer". Therefore, after annealing the first polymer of the semi-crystalline type is actually semi-crystalline.

The first polymer is thus a polymer of the semi-crystalline type, and it comprises one or more polymers selected from the group consisting of semi-crystalline aromatic polyesters, such as polyethylene terephthalate (PET), polybutylene terephthalate (PBT), polyethylene naphthalene (PEN) and their copolymers, polyphenylene sulfide (PPS), syndiotactic polystyrene (sPS), etc. Especially suitable seems polyethylene terephthalate. Hence, in a more specific embodiment, the semi-crystalline aromatic polyester is polyethylene terephthalate (PET). Further, the first polymer may include a copolymers of one or more the afore-mentioned polymers.

In embodiments of the invention, the polymeric material comprises a polyester (homo)polymer having repeating units of the general formula II:

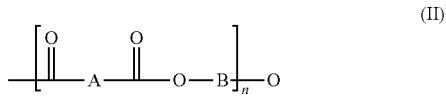

wherein A is selected from the following moieties:

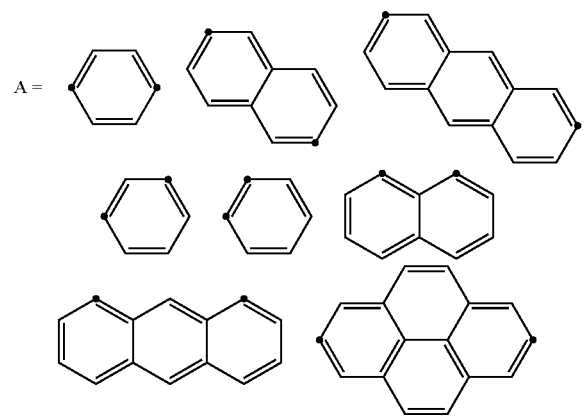

and wherein B is selected from the following moieties:

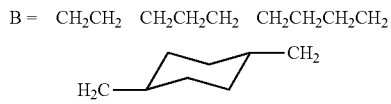

Alternatively or additionally, the thermoplastic material may comprise a polyester copolymer comprising various repeating units comprising any combination of said moieties at positions A and B. In particular, such a polyester copolymer may comprise first repeating units comprising any combination of said moieties at positions A and B, and comprising second repeating units comprising another combination of said moieties at positions A and B. That is, the copolymer may comprise first repeating units in which A is one of the above A moieties, and B is one of the two B moieties. The second repeating units may differ from the first repeating units either with respect to position A or with respect to position B, or both. In embodiments of the invention, the polymeric material may be made from one or more aromatic dicarboxylic acids, and may comprise polyethylene terephthalate and/or a copolymer thereof and/or polyethylene naphthalate and/or a copolymer thereof. In particular, the polymeric material may comprise polyethylene terephthalate (PET) or polyethylene naphthalate (PEN), or a copolymer thereof derived from 1,4-cyclohexanedimethanol.

In the annealing stage, the intermediate item is converted into the 3D item. This may accompanied by a (slight) shrinkage of the object, i.e. the intermediate item may have a larger volume than the final fused deposition modeling 3D printed item. In a design stage, this shrinkage may be taken into account. Hence, a larger intermediate item may be designed having dimensions that after annealing (substantially) are the desired (final) dimensions. Hence, in yet a further embodiment the method further comprises a design stage, comprising determining dimensions of the 3D item and defining dimensions of the intermediate 3D printed item taking into account a shrinkage during the annealing stage. The design stage precedes the generation stage. Further, optionally annealing may be executed until one or more predetermined dimensions are reached. The term "dimension" may refer to one or more of length, width, height, diameter, etc.

In yet a further aspect, the invention also provides the thus obtained 3D item. Hence, in an aspect the invention also provides a fused deposition modeling 3D printed item obtainable with the method as described herein. Such items may be distinguished from conventionally produced items by the layered structure. Even the annealing does not substantially change the layered structure. Hence, the 3D item can especially be distinguished as "3D FDM item" or 3D FDM printed item" or "FDM printed item".

The above indicated ranges in relation to the thermoplastic material substantially relate to the same ranges for the 3D item. Hence, in embodiments, the 3D printed material (of the fused deposition modeling 3D printed item) comprises 0-6 wt. % additive (relative to the total amount of the (semi-crystalline) first polymer. In yet other embodiments, the 3D printed material (of the fused deposition modeling 3D printed item) comprises at least 50 wt. %, especially at least 75 wt. %, such as even more especially at least 80 wt. %, yet even more especially at least 85 wt. %, such as even more especially at least 90 wt. % of the first—now semi-crystalline—polymer. Further, the degree of crystallinity of the—now semi-crystalline—first polymer is especially in the range of at least 20%, such as especially in the range of 20-70%, like at least 35%.

Therefore, in specific embodiment the invention also provides a fused deposition modeling 3D printed item comprising 3D printed material, the 3D printed material comprising 0-6 wt. % additive and at least 90 wt. %, such as at least 95 wt. %, of a semi-crystalline polymer, relative to the total weight of the 3D printed material, and the semi-crystalline polymer has a degree of crystallinity in the range of 20-70%, or even more. Therefore, the invention also provides a fused deposition modeling 3D printed item comprising 3D printed material, the 3D printed material comprising (a) an additive having a mass fraction of 0-6% and (b) a semi-crystalline polymer having a mass fraction of at least 90%, and wherein the semi-crystalline polymer has a degree of crystallinity in the range of at least 20%.

The 3D item as described herein, and as obtainable with the method as described herein, may be substantially any kind of item. The 3D item herein is especially a body, which may be partly hollow or which may be a massive body. The 3D item may be a plate, a shaped article, etc., etc. Specific examples of items that may be created with the present invention and may be the result of the method described herein are e.g. an optical (translucent) filter, a reflector, a light mixing chamber, a collimator, a compound parabolic concentrator, etc. Hence, in yet a further aspect the invention also provides the use of the fused deposition modeling 3D printed item as defined herein (e.g.) as translucent or reflective element.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
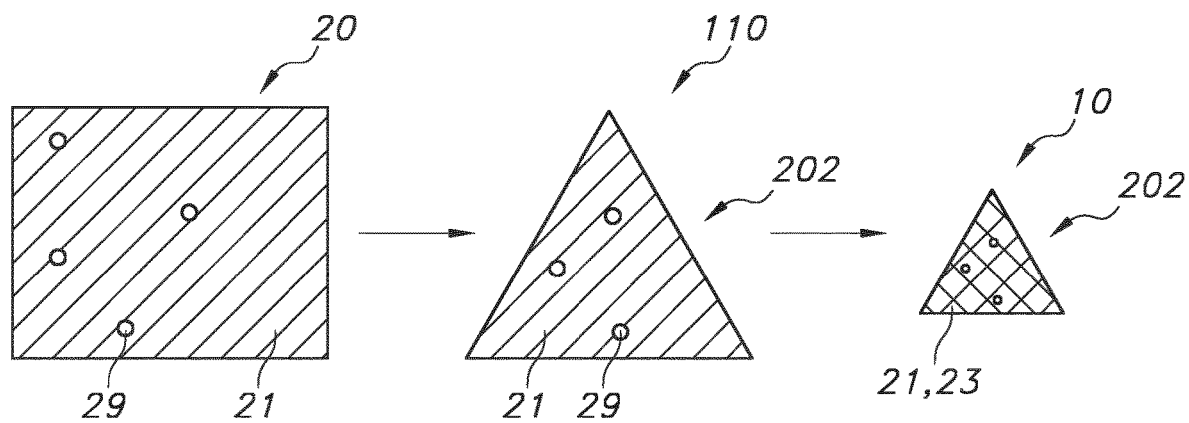
FIGS. 1a-1c schematically depict some aspects of the processes and products as described herein.

FIG. 1a very schematically depicts the stages of an embodiment of the method. A thermoplastic material 20 is provided. The thermoplastic material 20 comprises a first polymer 21 of the semi-crystalline type (but which is in this stage substantially not semi-crystalline). The thermoplastic material 20 may comprise 0-6 wt. % additive and e.g. at least 90 wt. % of the first polymer 21, relative to the total weight of the thermoplastic material 20. The thermoplastic material is printable material (printable with an FDM printer).

With a 3D printer of the FDM type (not shown, but see FIG. 1b), in a generation stage an intermediate 3D printed item 110 is obtained. The thermoplastic material 20 is thus especially printed with a fused deposition modeling 3D printer, wherein the thermoplastic material 20 is heated to a temperature equal to or above the melting temperature ($T_m$), while maintaining an ambient temperature ($T_a$) during printing below the glass temperature ($T_g$). After printing, the intermediate item 110 is obtained. Then, in an annealing stage the 3D item 10 is obtained by heating the intermediate 3D printed item 110 equal to or above the glass temperature ($T_g$). As the item may shrink during the heating, the final item 10 is schematically depicted smaller than the intermediate item 110.

In the first stage, the thermoplastic material 20 is provided. This is 3D printable material. The optional additive is indicated with reference 29. Further, the thermoplastic material 20 may comprise not only the first polymer 21, but also other polymers (e.g. not of the semi-crystalline type)(not depicted). In the generation stage a (shaped) intermediate item 110 is obtained. With the annealing stage, the final 3D item 10 is obtained. This item may still include the first polymer, indicated with reference 21. However, at least part thereof is now crystallized, providing a semi-crystalline first polymer. Hence, reference 23 indicates the first polymer 21 in the semi-crystalline state. Reference 202 indicates 3D printed material.

Figure 1B:
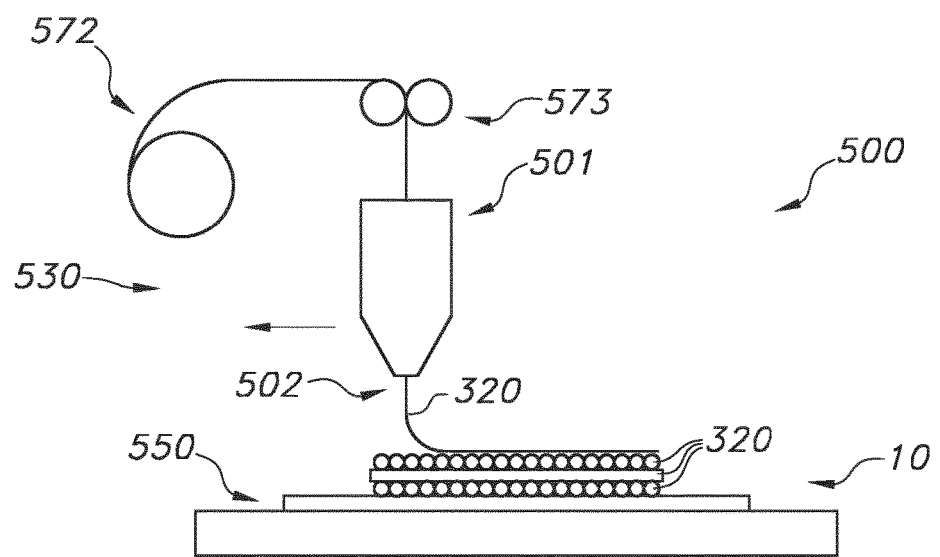

FIG. 1b schematically depict some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention. The 3D printer 500 is configured to generate a 3D item 10 by depositing on a receiver item 550 a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). Reference 572 indicates a spool with material, especially in the form of a wire. The 3D printer 500 transforms this in a filament or fiber 320. Arranging filament by filament and filament on filament, an intermediate 3D item 110 may be formed.

Figure 1C:
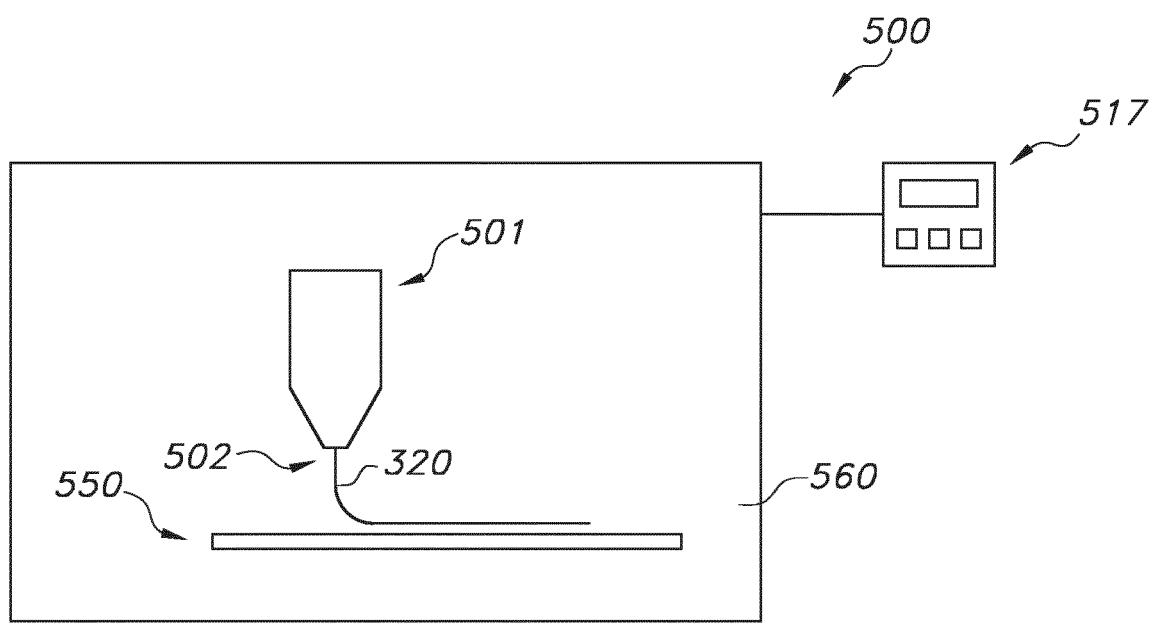

FIG. 1c schematically depicts an embodiment of the 3D printer 500 including a heating chamber 560. Within the heating chamber 560, the annealing stage may be executed. Reference 517 schematically depicts a control system configured to control the 3D printer 500. Note that annealing may also be executed with an apparatus independent of the 3D printer 500. The heating chamber 560 is an optional embodiment.

EXPERIMENTAL

Tests were executed with PET and with PC (bisphenol A polycarbonate). It appeared that PET provided good products, whereas PC did not provide stable products.

PET polymer with low crystallinity from Invista T94N with a $T_g$ of 78 C was applied. The crystallinity was below 2%. The polymer could be easily printed. Amongst others, a relatively complicated heat sink was printed.

After printing the object was still quite amorphous and had (still) a $T_g$ of 78° C. After printing the object was placed in an oven and gradually heated to 180° C. where it was annealed. The item was still in a perfect shape.

It was observed that after annealing the sample became white showing that the crystallinity of the sample also increases. PET has crystalline melting temperature of 250° C. As a result of annealing stage, the application temperature of the material increases to a great extent. Due to the annealing, the item can be used at temperature up to 200° C. or even above, whereas before annealing the glass temperature was limiting the use.

During crystallization the shape shows shrinkage. Therefore, during designing a shape one may need to account for dimensional changes during the annealing procedure so that the desired dimensions are obtained after annealing.

In a further experiment a PLA sample with the following dimensions: 50×5×2 mm was printed using an FDM printer. This strip was clamped in an oven with a weight of 50 g connected to one end. After 30 min. in an oven at 80° C. the strip bent 38 mm. After cooling and removing the weight the bending remained largely.

The same sample was also made and left without load in an oven at 80° for 2 hours. When the same bending experiment described above was performed, the strip bent only 5 mm. After cooling the strip returned nearly to its original form.

The stability, initially determined by the $T_g$ of about 60° C., after annealing is determined by the melting point of about 175° C.

In yet another experiment, similar to the former experiment, PET (Invista T94N) was used. The annealing and stability experiments were performed at 130° C. The non-crystalline sample bent completely after a few minutes in the oven at 130°. After removing the weights and cooling the bending did not reverse. The sample that had crystallized for 3 hours at 130° C. bent only a 6 mm after 30 minutes in the oven at 130° C. After removing the weights the bending reversed already at 130° C. The stability, initially determined by the Tg of about 77° C., is determined by the melting point above 240° C., after annealing.

Parts manufactured by FDM printing and further annealing can be applied at temperatures of 80° C. or higher. Especially for lighting applications (luminaires) where locally temperatures of 80° C. or higher may occur, the use of the present invention, with polymers such as PLA and PET, especially PET, may be used to avoid distortion of the product during operation. Hence, the flexibility of 3D printing may be combined with stable 3D printed products.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method for manufacturing a 3D item with a fused deposition modeling 3D printer, the method comprising:
   providing a thermoplastic material comprising (a) a first polymer having a mass fraction of at least 90%, and (b) an additive having a mass fraction of 0-6%, wherein the first polymer is a semi-crystalline aromatic polyester;
   generating in a generation stage an intermediate 3D printed item by printing the thermoplastic material, wherein the thermoplastic material is heated to a temperature equal to or above a melting temperature (Tm) of the thermoplastic material, while maintaining during printing an ambient temperature (Ta) of the 3D printed item under construction below the glass temperature ($T_g$) of the first polymer; and
   generating in an annealing stage said 3D item by heating the intermediate 3D printed item to a temperature equal to or above the glass temperature ($T_g$) of the first polymer,
   wherein the method further comprises a design stage, comprising determining dimensions of the 3D item and defining dimensions of the intermediate 3D printed item taking into account a shrinkage during the annealing stage.

2. The method according to claim 1, wherein the fused deposition modeling 3D printer comprises a receiver item, and wherein the method further comprises maintaining the receiver item during at least part of the generation stage at a temperature below the glass temperature ($T_g$) of the first polymer.

3. The method according to claim 1, wherein the fused deposition modeling 3D printer comprises a printing chamber within which the generation stage is executed, and wherein the method further comprises maintaining the printing chamber during at least part of the generation stage below the glass temperature ($T_g$) of the first polymer.

4. The method according to claim 3, wherein the method comprises heating the printing chamber during at least part of the annealing stage at a temperature equal to or above the glass temperature ($T_g$) of the first polymer.

5. The method according to claim 1, wherein the method comprises heating the intermediate 3D printed item to a temperature equal to or above the glass temperature ($T_g$) of the first polymer until the first polymer obtains a degree of crystallinity of at least 20%.

6. The method according to claim 1, wherein the additive has a mass fraction of 0-1% of the additive and wherein the first polymer has a mass fraction of at least 95%, relative to the total weight of the thermoplastic material.

7. The method according to claim 6, wherein the additive comprises one or more of a colorant, a luminescent material, and a reflective material.

8. The method according to claim 1, wherein the first polymer has a glass temperature ($T_g$) below 120° C. and a melting temperature (Tm) of at least 150° C.

9. The method according to claim 1, wherein the first polymer has a melting temperature (Tm) of at least 200° C.

10. The method according to claim 1, wherein the semi-crystalline aromatic polyester is polyethylene terephthalate (PET).

* * * * *